United States Patent [19]

Ohtani et al.

[11] Patent Number: 5,305,653
[45] Date of Patent: Apr. 26, 1994

[54] ROBOT WRIST MECHANISM

[75] Inventors: Yukio Ohtani, Kawasaki; Satoshi Uehara, Yokohama; Masahiro Igarashi, Kawasaki; Hiroshi Suzuki, Yokohama, all of Japan

[73] Assignee: Tokico Ltd., Kanagawa, Japan

[21] Appl. No.: 951,154

[22] Filed: Sep. 25, 1992

[30] Foreign Application Priority Data

Sep. 30, 1991 [JP] Japan .................. 3-252571
Mar. 19, 1992 [JP] Japan .................. 4-64180

[51] Int. Cl.⁵ .................. B25J 17/02; B25J 18/00
[52] U.S. Cl. .................. 74/479 BP; 74/479 BW; 901/26; 901/29
[58] Field of Search .................. 74/479 BP, 479 BW; 901/26, 29

[56] References Cited

U.S. PATENT DOCUMENTS

| 4,353,677 | 10/1982 | Susnjara et al. | 901/26 X |
| 4,576,545 | 3/1986 | Maeda | 901/29 X |
| 4,662,815 | 5/1987 | Zimmer | 901/29 X |
| 4,807,486 | 2/1989 | Akeel et al. | 901/26 X |
| 4,984,959 | 1/1991 | Kato | 901/26 X |

FOREIGN PATENT DOCUMENTS 378932 7/1990 European Pat. Off. .......... 901/26
60-48291 3/1985 Japan .

Primary Examiner—Allan D. Herrmann
Attorney, Agent, or Firm—Scully, Scott, Murphy & Presser

[57] ABSTRACT

A robot wrist mechanism such as those used for painting, sealing and welding operations is disclosed. The robot wrist mechanism comprises an arm rotated by a drive source; a first wrist member rotatably supported on the end of the arm so as to be rotatable about a first rotation axis; a second wrist member supported at another end of the first wrist member so as to be freely rotatable about a second rotation axis. The second axis and the arm axis are arranged to lie in the same plane. A mounting shaft is provided on the second wrist member with an axis of the mounting shaft lying in a plane including the first axis and orthogonal to the second axis. The second wrist member is arranged to protrude upwards with respect to a plane including the first axis and the axis of the mounting shaft. With the robot wrist mechanism of the present invention, the drive mechanism transmitting the drive force of the drive shaft to the mounting shaft protrudes upwards of a line through the mounting shaft and arm. As a result, the operability of a robot having this arm during direct teaching is greatly improved.

18 Claims, 14 Drawing Sheets

ROBOT WRIST MECHANISM

BACKGROUND OF THE INVENTION

1. Field of the Invention

The present invention relates to a robot wrist mechanism of particular application to industrial robots such as those used for painting, sealing and welding operations.

2. Prior Art

Industrial robots for industrial use have been disclosed, for example in Japanese Patent Application first Publication No. 60-48291. The robot of this disclosure is shown in the figures from FIG. 17 to FIG. 19.

With this robot, a first wrist member 71 of an overall L-shape is provided at the end of a second arm 70. The first wrist member 71 is axially supported on the end of the second arm 70, so as to be rotatable about a horizontal first axis of rotation orthogonal to the axis of the second arm 70. A second wrist member 72 is supported on an upper face on the end of the first wrist member 71 with an axis parallel to the upper face, and rotatable about a second axis of rotation orthogonal to the upper face. A wrist end portion 73 is axially supported at the end of the second wrist member 72 so as to be rotatable about an axis of the second wrist member 72.

Plane gears 74, 75, 76 are disposed on the first axis of rotation inside the first wrist member 71 and provide a geared connection between the first wrist member 71 and the second wrist member 72. In this conventional example, as shown in FIG. 17 and 18, the first wrist member 71 is constructed so that when held with the third axis horizontal it protrudes downward with respect to a plane including the first and third axes.

As shown in FIG. 19, transmission of a rotary force to the first wrist member 71, second wrist member 72 and wrist end portion 73 utilizes a wrapped around transmission member 77. In particular, the transmission of the rotary force to the second wrist member 72 and wrist end member 73 utilizes the respective pairs of bevel gears 79a, 79b, and 78a, 78b. The bevel gears 78a, and 79a of the pairs of bevel gears 78a, 78b and 79a, 79b are arranged inside the first wrist member 71 with their pitch cone angles facing in opposite directions.

There is a problem however with the above conventional robot wrist mechanism, in that when it is used for example in a direct teaching type robot where the teaching is carried out with an end-effector such as a paint gun, the teaching becomes difficult. In general, when carrying out direct teaching, then as discussed later with reference to FIG. 5, it is common practice to fit a teaching handle so as to support the weight of the end-effector in a gravitational direction. However, with the wrist mechanism of the conventional robot, when a teaching handle is fitted, the downward protruding portion of the first wrist member 71 becomes an obstacle.

Furthermore, with the direct drive type robot which is ideally suited to direct teaching, it is common to use motors fitted with single rotation type detectors and arranged in series. However in this case, the bevel gears 78a, 79a inside the first wrist member 71 are used in an opposite sense so that their shafts are susceptible to interference with each other, making it difficult to obtain independent wide operating angles about the respective axis of rotation.

Also with wrist mechanisms having the above type of construction, the first wrist member 71 generally swings up and down about the axis orthogonal to the axis of the second arm 70, with the second arm 70 fixed. Hence with this type of construction, it is difficult to avoid mutual interference between the second arm 70, the first wrist member 71 and the second wrist member 72. By providing an appropriate space however between the members, this interference may be minimized. The required size of this space determines the operating angle of the wrist mechanism. For example, although there may be a wide operating range in the up down direction, and the left right direction, it is difficult to ensure this operating range in both the up down and left right directions. Consequently, if an operating range is used in which the range in the up down direction is large with respect to the length of the work, then there will be some range in which left right work is not possible.

With the conventional robot, due to the mutual interference between the first wrist member 71 and the second wrist member 72, there is provided a wrist mechanism suited for use in the up down direction and a wrist mechanism suited for use in the left right direction, so that at least one is suited for a particular direction. Consequently, depending on the work shape, it is necessary to change the wrist mechanism to suit. As a result, not only is time lost in changing the wrist mechanism but also a number of wrist mechanisms must be kept on hand so that operating efficiency is compromised. Furthermore, although there are recent new designs for wrist mechanisms that have a wide operating range in all directions, these designs are generally complicated and involve a large size wrist mechanism.

SUMMARY OF THE INVENTION

It is an object of the present invention to address the above problems and provide a robot wrist mechanism having the following features. That is to say, a robot mechanism comprising an arm rotated by a drive source, said arm having an axis; a first wrist member rotatably supported on the end of the arm so as to be rotatable about a first rotation axis orthogonal to the axis of the arm; a second wrist member supported at another end of the first wrist member so as to be freely rotatable about a second rotation axis, wherein the second axis and the arm axis lie in the same plane; a mounting shaft provided on the second wrist member with an axis of the mounting shaft lying in a plane including the first axis and orthogonal to the second axis, wherein the second wrist member protrudes upwards with respect to a plane including the first axis and the axis of the mounting shaft.

With the robot wrist mechanism of the present invention, the drive mechanism transmitting the drive force of the drive shaft to the mounting shaft protrudes upwards of a line through the mounting shaft and arm. As a result, the operability of a robot having this arm during direct teaching is greatly improved.

The present invention provides a robot wrist mechanism having the following construction. That is to say, having an arm rotated by a drive source, this arm having a plurality of output shafts driven by the drive source, the output shafts being arranged concentric with the axis of the arm, a wrist member fitted to the end of the arm and being swingable by the drive force supplied from the drive shaft, bevel gears provided at the ends of the respective output shafts of the arm, bevel gears provided on the wrist member so as to be engagable with the bevel gears, a fastening mechanism connecting the wrist member with respect to the end face of the arm, the fastening mechanism being able to connect the wrist member at relative rotated conditions at predetermined angles with respect to the axis of the arm.

With the wrist mechanism described above, the fastening mechanism is able to connect the wrist member in a relative rotated condition at a predetermined angle with respect to the axis of the arm, while maintaining the pair of bevel gears in an engaged condition. Accordingly, the rotational axis of the wrist member may be changed by changing only the attachment condition of the fastening mechanism. As a result, the protruding direction of the wrist member may be easily adjusted so that by due consideration of the required operational features of the wrist mechanism and range of operation, an operating range appropriate for the required operation may be obtained. In practice a flange face is provided on both the arm and wrist member, and both members may be bolted together at a position where the flange bolt holes for relative rotation of both members are in alignment.

DETAILED DESCRIPTION OF THE EMBODIMENTS OF THE INVENTION

As follows is a detailed explanation of the embodiments of the present invention based on the drawings.

Figure 1:
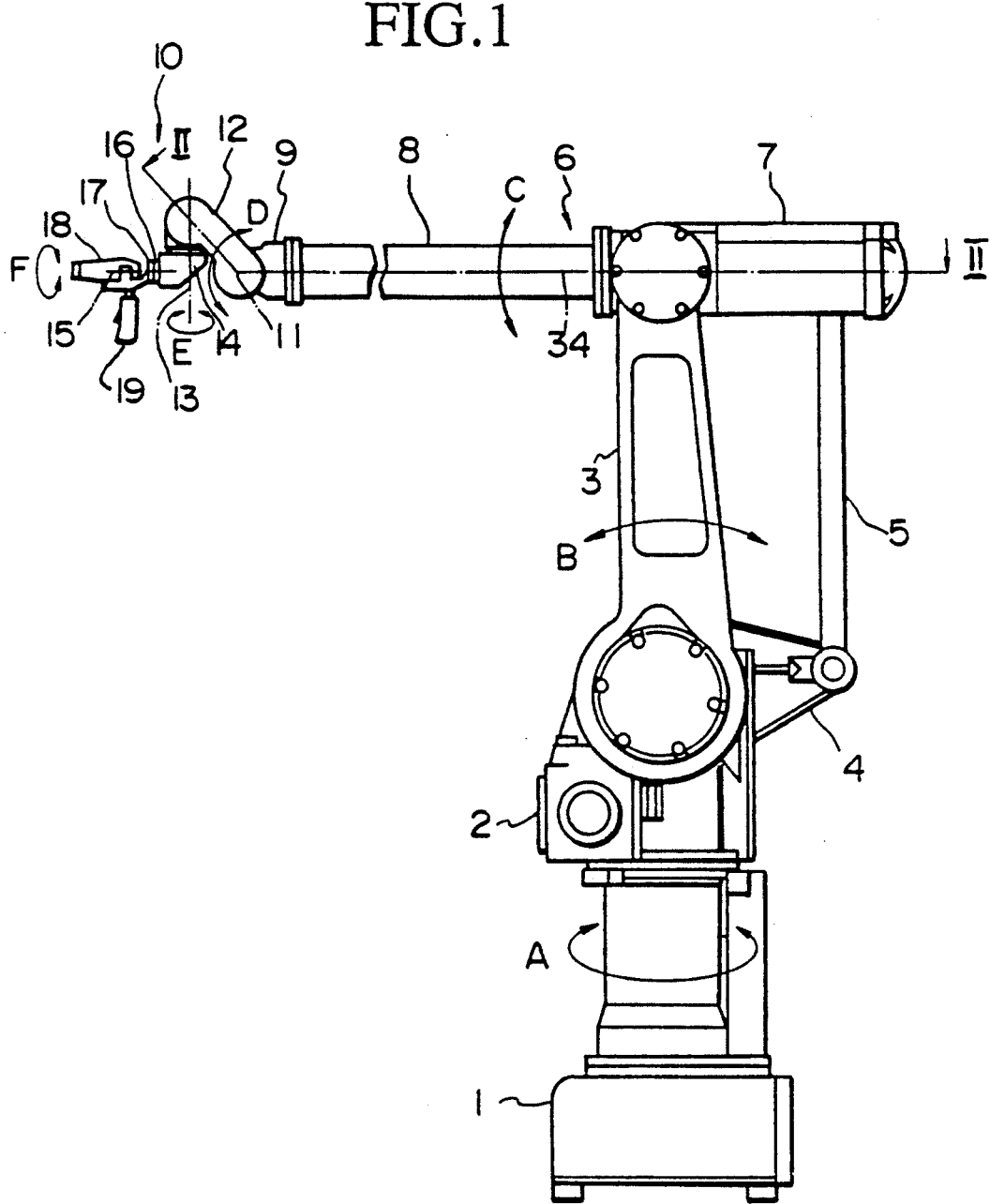
FIG. 1 shows an overall view of a painting robot according to a first embodiment.

FIG. 1 shows an overall view of a robot applicable to the present invention. A base 1 is fixed to the floor, and a rotating base 2 is supported on the base 1 so as to rotate freely in the direction of an arrow A. One end of an arm 3 is supported on the rotating base 2 so as to rotate freely in the direction of an arrow B, and a second arm 6 is supported on the other end of the arm 3 so as to rotate freely in the direction of an arrow C. Link members 4 and 5 connect the second arm 6 and the rotating base 2.

The second arm 6 comprises an arm base 7, a trunk 8 and an arm end portion 9. A wrist 10 is attached to the arm end portion 9. The wrist 10 comprises a first case member 12 rotatable in the direction of an arrow D about a first rotation axis 11 of the arm end 9, a second case member 14 rotatable in the direction of an arrow E about a second rotation axis 13 of the first case member 12, and a shaft member 16 rotatable in the direction of an arrow F about a third rotation axis 15 of the second case member 14. A painting gun 18 is attached to the shaft member 16 by means of an attachment bracket 17, and a teaching handle (operating handle) 19 for direct teaching is provided on the attachment bracket 17.

With this arrangement, the first axis 11 is orthogonal to the arm axis 34. The second axis 13 is disposed in a vertical plane including the arm axis 34, while the third axis 15 is orthogonal to the second axis 13 and disposed in a vertical plane including the first axis 11.

Figure 2:
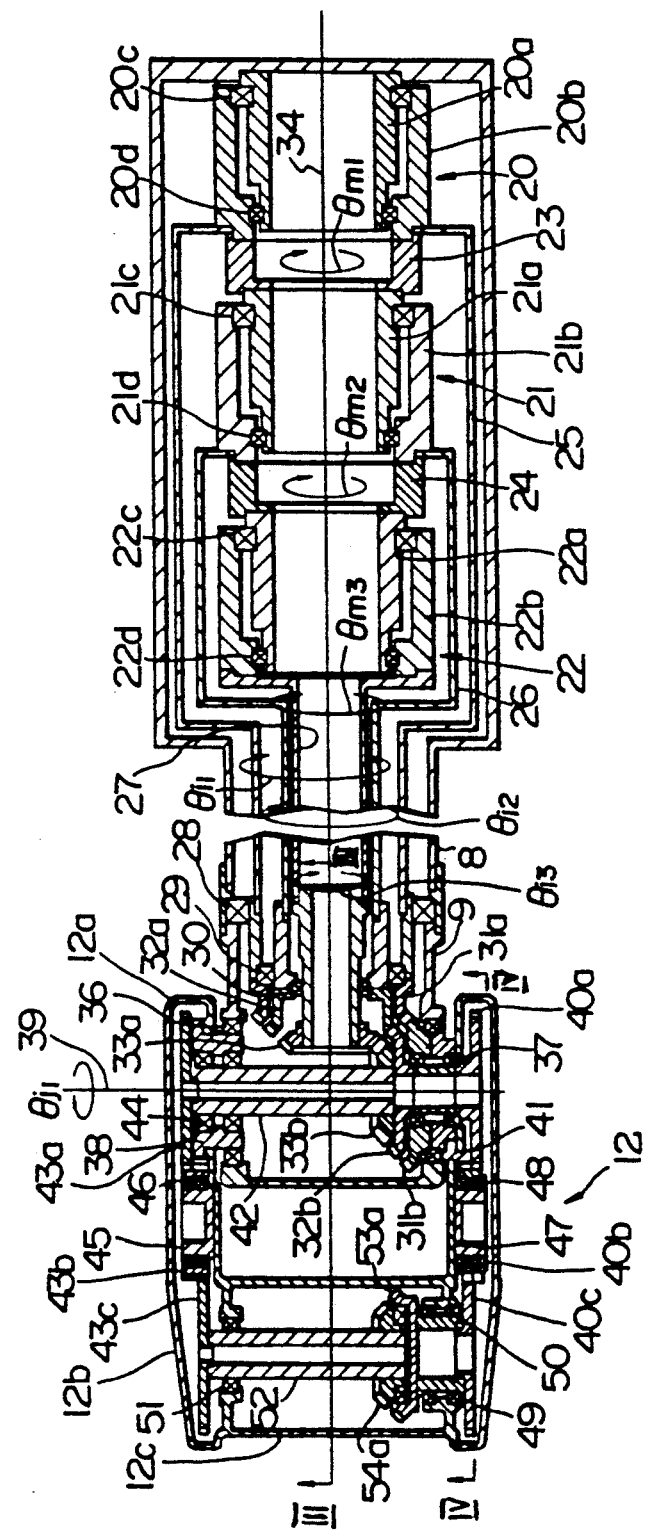
FIG. 2 shows a cross sectional view along a line II—II of FIG. 1 showing a second arm and wrist of the painting robot according to the first embodiment of the present invention.

FIG. 2 shows a sectional diagram along the line II—II of the second arm 6. A stator 20a of a direct drive motor (subsequently referred to as DD motor) 20 is fixed to the end portion of the arm base 7. A rotor 20b is rotatably supported in the stator 20a by means of bearings 20c, 20d, and a cylindrically shape spacer 23 is fixed to the rotor 20b. Furthermore, the stator 21a of a DD motor 21 is connected to the spacer 23 and successively, a spacer 24 is connected to the rotor 21b, and a stator 22a of a DD motor 22 is connected to the spacer 24.

The rear ends of cylindrical members 25, 26, 27 disposed coaxially with the arm trunk member 8 are fixed to respective rotors 20b, 21b and 22b. Front portions of the cylindrical members 25, 26, 27 are supported in bearings 28, 29, 30 inside the arm end 9, and bevel gears 31a, 32a, 33a are attached to respective end tips thereof.

A bevel gear 31a meshes with a bevel gear 31b, and the bevel gear 31b is supported so as to rotate freely in the arm end 9 by means of bearing 35, and is fixed to a case arm portion 12a of the first case member 12 by means of a flange 41. Further, a case arm 12b on the opposite side of the first case member 12 is supported so as to be freely rotatable in the arm end 9 on a bearing 36 by way of a flange 38.

The bevel gear 32a engages with a bevel gear 32b and is connected integral with the plain gear 14a by way of a shaft 39. The bevel gear 31b is supported in flange 41 by a bearing 37 so as to rotate freely. A plain gear 40a engages with a plain gear 40b which is supported by a bearing 48 so as to rotate freely on a shaft 47 formed integral with the case arm 12a. A plain gear 40c engages with the plain gear 40b. The plane gear 40c is connected integral with a bevel gear 53a by means of a shaft 50 and is rotatably supported in the case arm 12c by means of a bearing 49.

The bevel gear 33a meshes with a bevel gear 33b which is connected integral with a plain gear 43a by means of a shaft 42. The assembly is supported so as to rotate freely on the flange 38 by means of a bearing 44. The plane gear 43a engages with a plane gear 43b which is supported so as to rotate freely about a shaft 45 by means of a bearing 46. The shaft 45 is connected integral with the case arm 12b. A plane gear 43c engages with the plane gear 43b, and is connected integral with a bevel gear 54a by means of a shaft 52. The assembly is supported so as to rotate freely in the case hub 12c by means of a bearing 51. With this arrangement, the pitch cones of the bevel gears 53a, 54a are arranged together so as to be on the same side of the arm axis 34.

Figure 3:
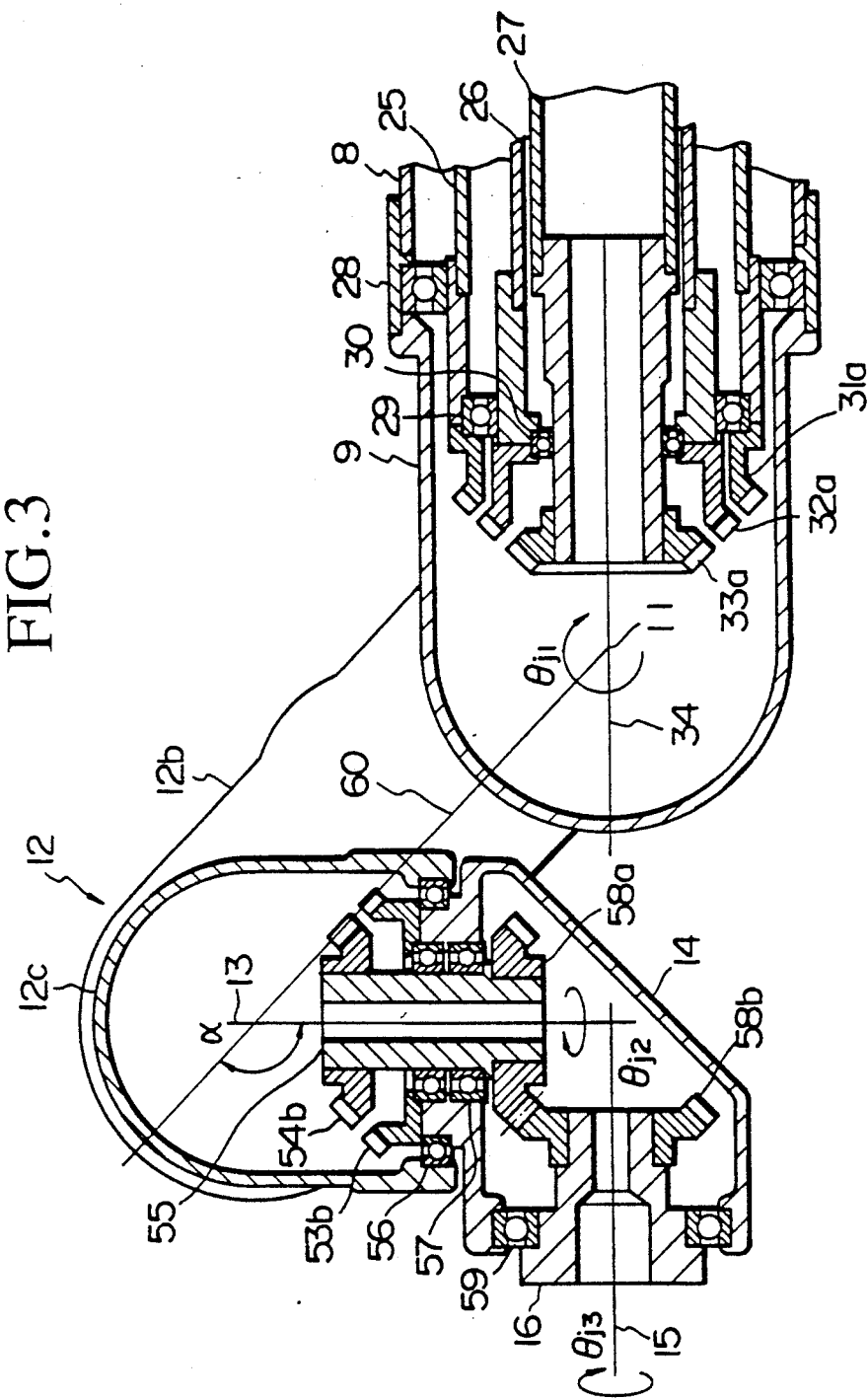
FIG. 3 shows a cross sectional view along a line III—III of FIG. 2 showing the second arm and wrist of the painting robot according to the first embodiment of the present invention.

FIG. 3 shows a sectional view along the line III—III of the second arm 6. A bevel gear 53b which engages with the bevel gear 53a is connected integral with the second case member 14. The second case member 14 is supported so as to rotate freely within the case hub 12c by means of a bearing 56. A bevel gear 54b which engages with the bevel gear 54a is connected integral with a bevel gear 58a by means of a shaft 55, and is rotatably supported in the second case member 14 by means of a bearing 57. The bevel gear 58a engages with a bevel gear 58b which is connected integral with the shaft member 16 rotatably supported in the second case member 14 by means of a bearing 59.

Figure 4:
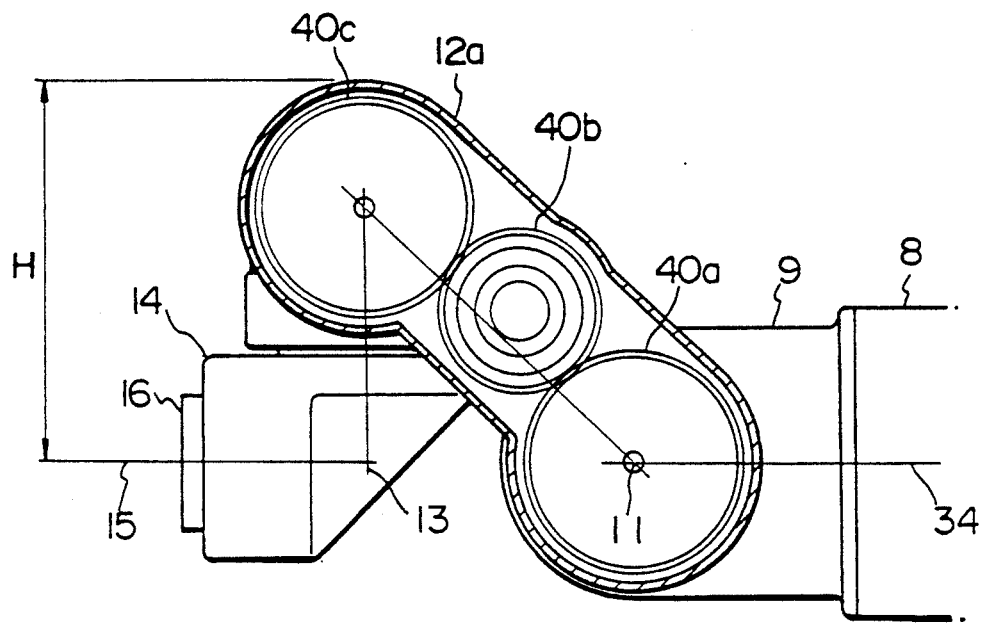
FIG. 4 shows a cross sectional view along a line IV—IV of FIG. 2 showing the second arm and wrist of the painting robot according to the first embodiment of the present invention.

In order to arrange the third axis 15 and the first axis 11 disposed in the same plane, the second axis 13 is inclined at an angle of only $\alpha$ with respect to the axis 60 of the first case member 12. As a result, with the wrist mechanism of the present invention as shown in FIG. 4, the second axis 13 and the axis 60 of the first case member 12 protrude in an opposite direction to the gravitational direction (upwards in FIG. 4), from a plane including the third axis 15 and the first axis 11, with the first case member having a protruding height of H.

Figure 5:
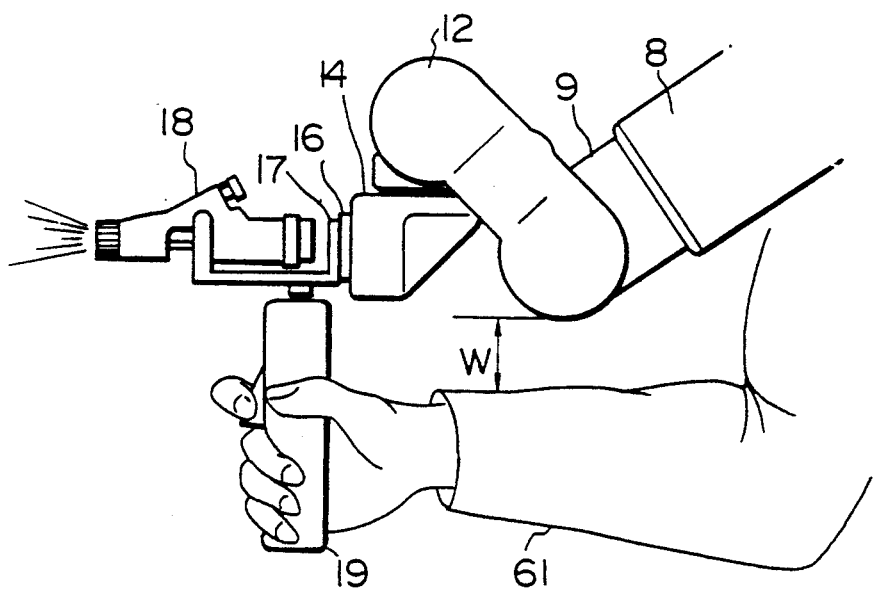
FIG. 5 shows a side view of the painting robot of the present invention during direct teaching.

As follows is a description of the operation of the wrist mechanism of the present invention with reference to FIGS. 2, 3 and 5. The teaching handle 19 is fitted to the bracket 17 so as to extend downward therefrom. The bracket 17 is attached to the shaft member 16 on the end of the wrist 10. The operator uses the teaching handle to teach the unit by aiming the spray gun. During this operation the larger the gap W between the robot and the operator 61, the easier the operation. As shown in FIG. 5, since the protruding portion on the side where the teaching handle is fixed is small, it is possible for the gap W to be large.

In FIG. 2 and FIG. 3, $\theta m$ indicates the motor drive angles (angle of the rotor relative to the stator), $\theta i$ indicates the input angles to the wrist 10, and $\theta j$ indicates the joint angles. The directions shown by the arrows in the respective figures are taken as positive. The rotation of the DD motor 20 is transmitted to the first case member 12 by way of the cylindrical member 25 and the bevel gears 31a, 31b so that the first case member 12 is rotated about the first rotation axis 11. In this case, the whole of the DD motors 21, 22 are rotated through the same angle as the rotation angle of the cylindrical member 25 with respect to the arm base 7.

The rotation of the DD motor 21 is transmitted to the second case member 14 by way of the cylindrical member 26, the bevel gears 31a, 31b, the plane gears 40a, 40b, 40c, and the bevel gears 53a, 53b so that the second case member 14 is rotated about the second rotation axis 13. In this case, the whole of the DD motor 22 rotates relative to the arm base 7 through an angle equal to the rotation angle of the cylindrical member 26.

The rotation of the DD motor 22 is transmitted to the shaft member 16 by way of the cylindrical member 27, the bevel gears 33a, 33b, the plane gears 43a, 43b, 43c and the bevel gears 54a, 54b, 58a, 58b.

When the first case member 12 rotates about the first rotation axis 11, the plane gears 40b, 43b rotate on their own axis while revolving about the plane gears 40a, 43a. Consequently, the plane gears 40c, 43c and the bevel gears 53a, 54a move relative to the first case member 12, and interference occurs with movement between the axes. In this case, the wrist joint angle $\theta j$ may be expressed with respect to the input angle $\theta i$ by the following equations (1).

$$\theta j1 = -\theta i1$$

$$\theta j2 = \theta i1 - \theta i2$$

$$\theta j3 = \theta i2 - \theta i3 \qquad (1)$$

Where the relation between $\theta i$ and $\theta m$ is given by the following equations (2).

$$\theta i1 = \theta m1$$

$$\theta i2 = \theta m1 + \theta m2$$

$$\theta i3 = \theta m1 + \theta m2 + \theta m3 \qquad (2)$$

Substituting equations (2) into equations (1) gives equations (3).
$$\theta j1 = -\theta m1$$

$$\theta j2 = -\theta m2$$

$$\theta j3 = -\theta m3 \qquad (3)$$

According to the equations (3), by arranging the motors and gears as discussed in the above embodiment, not only can interference between the shafts can avoided, but also the respective joints $\theta j$ of the wrist 10 may be driven independently with respect to the motor drive angle $\theta m$. As a result, even when using a single rotation type motor, interference between the shafts is avoided. Consequently, each of the joints can rotate independently through a large operating angle.

Figure 6:
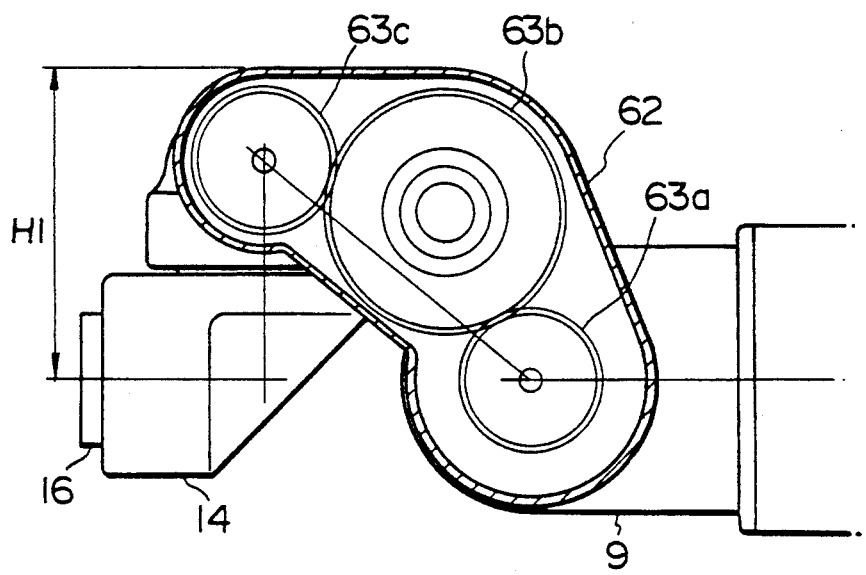
FIG. 6 shows a longitudinal sectional view of a part of the second arm and wrist of the painting robot according to a second embodiment of the present invention.
Figure 7:
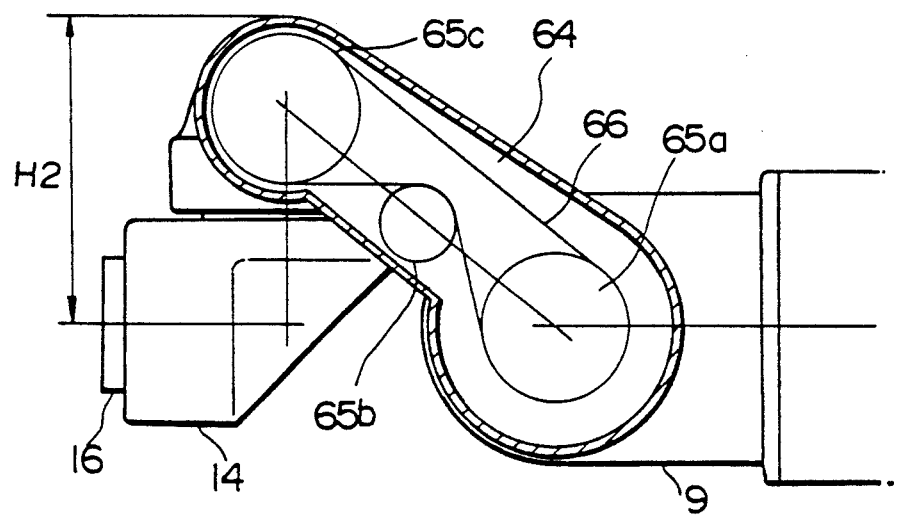
FIG. 7 shows a longitudinal sectional view of a part of the second arm and wrist of the painting robot according to a third embodiment of the present invention.

FIGS. 6 and 7 show other embodiments of the present invention. In these embodiments the protruding portion of the wrist 10 is also formed so as to protrude upwards, and the amount of protrusion is reduced. In FIG. 6 the pitch diameter of the plane gears 63a, 63b, 63c inside the first case member 62 are changed so that the height H1 of the protruding portion may be reduced.

In FIG. 7, a timing belt 66 is wrapped around pulleys 65a, 65b, 65c in place of the plane gears, so that the height H of the protruding portion may be reduced. By reducing the protruding portion on the wrist 10, interference between the work and the wrist 10 may be reduced so that the operability of the robot is further increased.

The above embodiments illustrate the case when either of the shaft members 25, 26, 27 are driven by the respective DD motors 20, 21, 22 provided inside the arm base 7 of the second arm 6. If required the motors may be fitted inside the base 1, the rotating base 2 or the first arm 3, and the rotation of the motors transmitted to the shaft members 25, 26, 27 by means such as a belt drive transmission.

DESCRIPTION OF OTHER EMBODIMENTS

As follows is a description of other embodiment according to the present invention.

Figure 8:
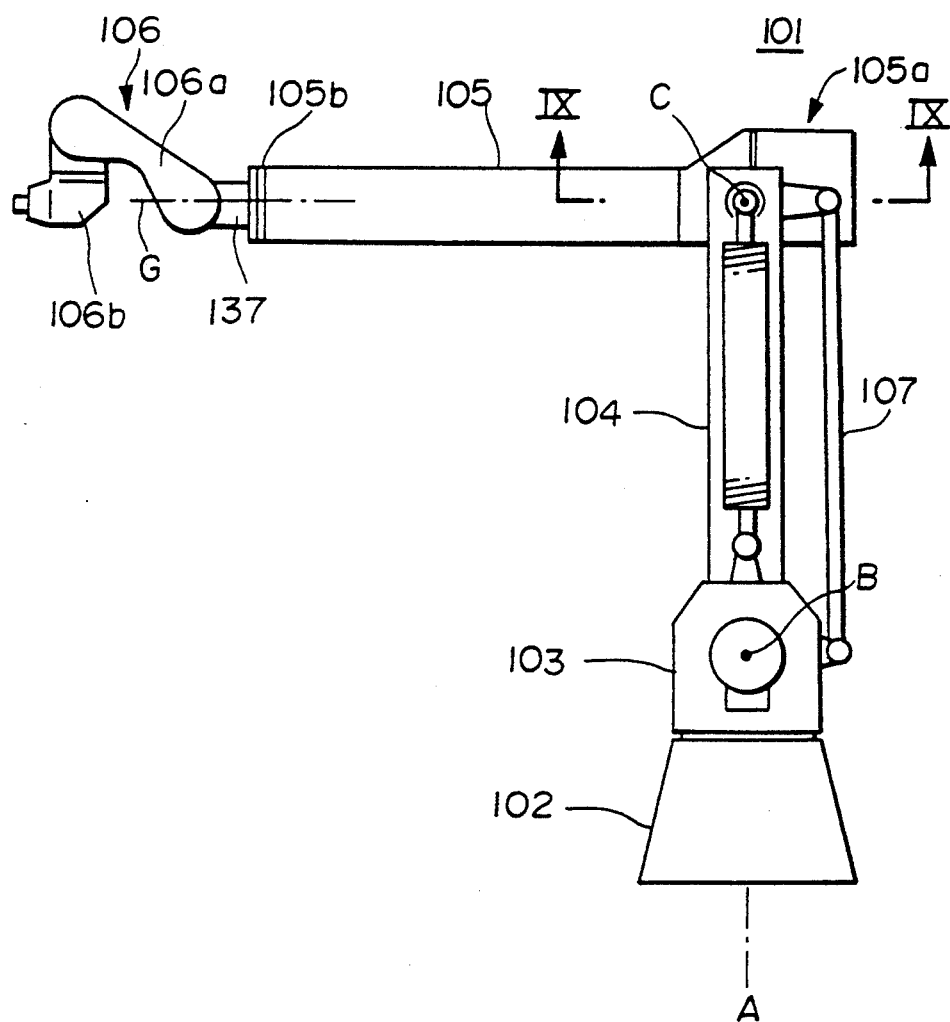
FIG. 8 shows an overall view of an industrial robot with a loaded wrist mechanism according to another embodiment of the present invention.

FIG. 8 shows a robot 101 incorporating the wrist mechanism of the present invention. The robot 101 comprises a fixed base 102, a rotating base 103 rotatably supported on the fixed base 102 and coaxial with the axis A thereof, a first arm 104 supported on the rotating base 103 so as to be freely swingable about an axis B, a second arm 105 supported on the end of the first arm 104 so as to be freely swingable about an axis C, and a wrist 106 provided on an end portion of the second arm 105.

The wrist 106 comprises a first wrist member 106a swingable about an axis H orthogonal with respect to an axis G, and a second wrist member 106b connected to the end of the first wrist member 106a so as to be swingable about an axis J orthogonal to the axis H. As a result, the wrist 106 has a plurality of degrees of freedom from the second arm 105 by being swingable about the axis H and the axis J.

The rotating base 103 is driven by a motor fitted inside the fixed base 102. The first arm 104 and second arm 105 are driven by respective motors fitted inside the rotating base 103. Furthermore, symbol 107 indicates a link mechanism connecting the motor for driving the second arm 105, to the second arm 105.

Figure 9:
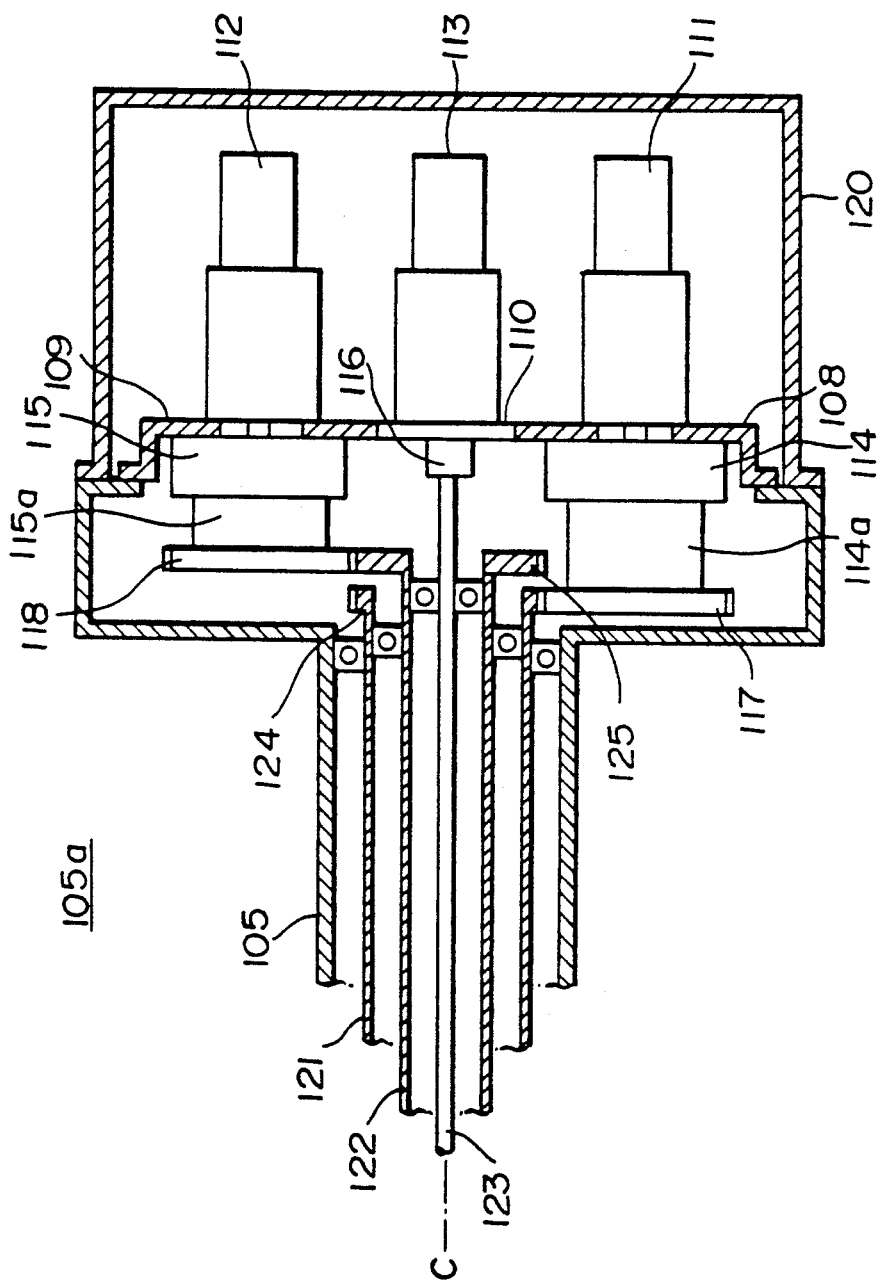
FIG. 9 shows a cross sectional view of one part along a line IX—IX of FIG. 8.

As shown in FIG. 9, motors 111, 112, 113 for driving the wrist mechanism are fixedly attached by means of brackets 108, 109, 110 to the rear end 105a of the second arm 105.

Respective reduction units 114, 115 are fitted to the respective motors 111, 112, and respective plane gears 117, 118 are fitted to the output shafts 114a, 115a of the reduction units. Cylindrically shaped output shafts 121, 122, 123 are provided inside the second arm 5 so as to be freely rotatable therein, with their axis aligned concentric with the axis G. A plane gear 124 provided on the rear end of output shaft 121 is engaged with a plane gear 117, and a plane gear 125 provided on the rear end of the drive shaft 122 is engaged with a plane gear 118 so that the respective gears are able to be driven. The drive shaft of the motor 113 (not shown in the figure) is connected directly to the output shaft 123 by way of a coupling 116. Symbol 120 in the figure indicates a case which covers the three motors 111, 112 and 113.

Figure 10:
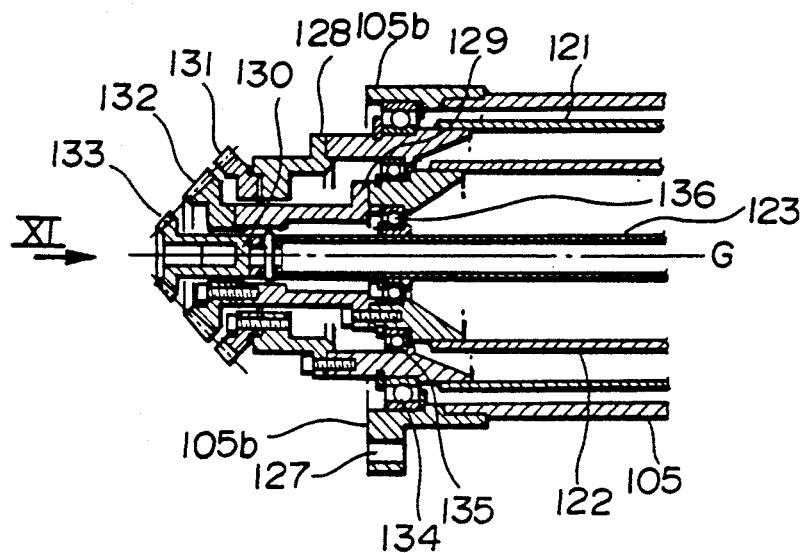
FIG. 10 shows a cross sectional view of the structure of the tip portion of the arm of FIG. 8.
Figure 11:
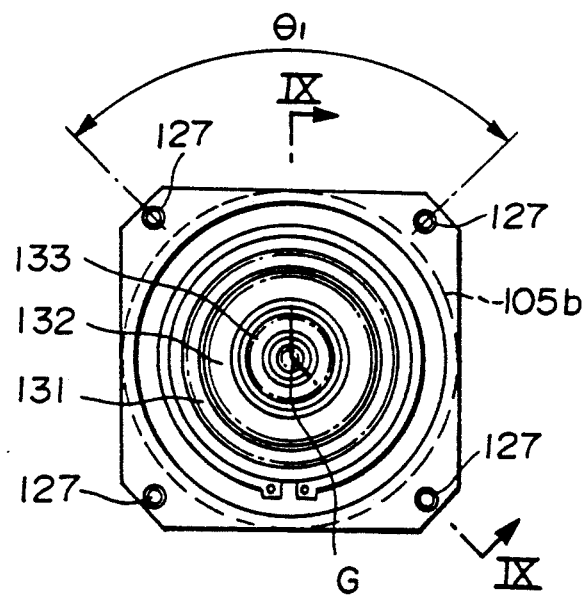
FIG. 11 shows a view in the direction of an arrow XI of FIG. 10.

FIG. 10 shows the end portion of the second arm 105. A flange 105b is provided on the end face of the second arm 105. The flange 105b as shown in FIG. 11 has a square shape when viewed from the front. Attachment holes 127 for supporting the wrist 106 are provided at the four corners of the flange 105, evenly spaced on a circle coaxial with the axis G. Consequently, with this embodiment, the subtended angle θ1 between adjacent attachment holes 127 and the axis G is 90°.

Adaptors 128, 129, 130 are connected to respective end portions of the output shafts 121, 122, 123 and extend from the end face of the flange 105b. Bevel gears 131, 132, 133 are fixedly attached to the respective ends of the adaptors 128, 129, 130 with concentric axes coinciding with the axis G. The group of adaptors 128, 129, 130 are supported so as to be freely rotatable with respect to each other about the axis G.

Figure 12:
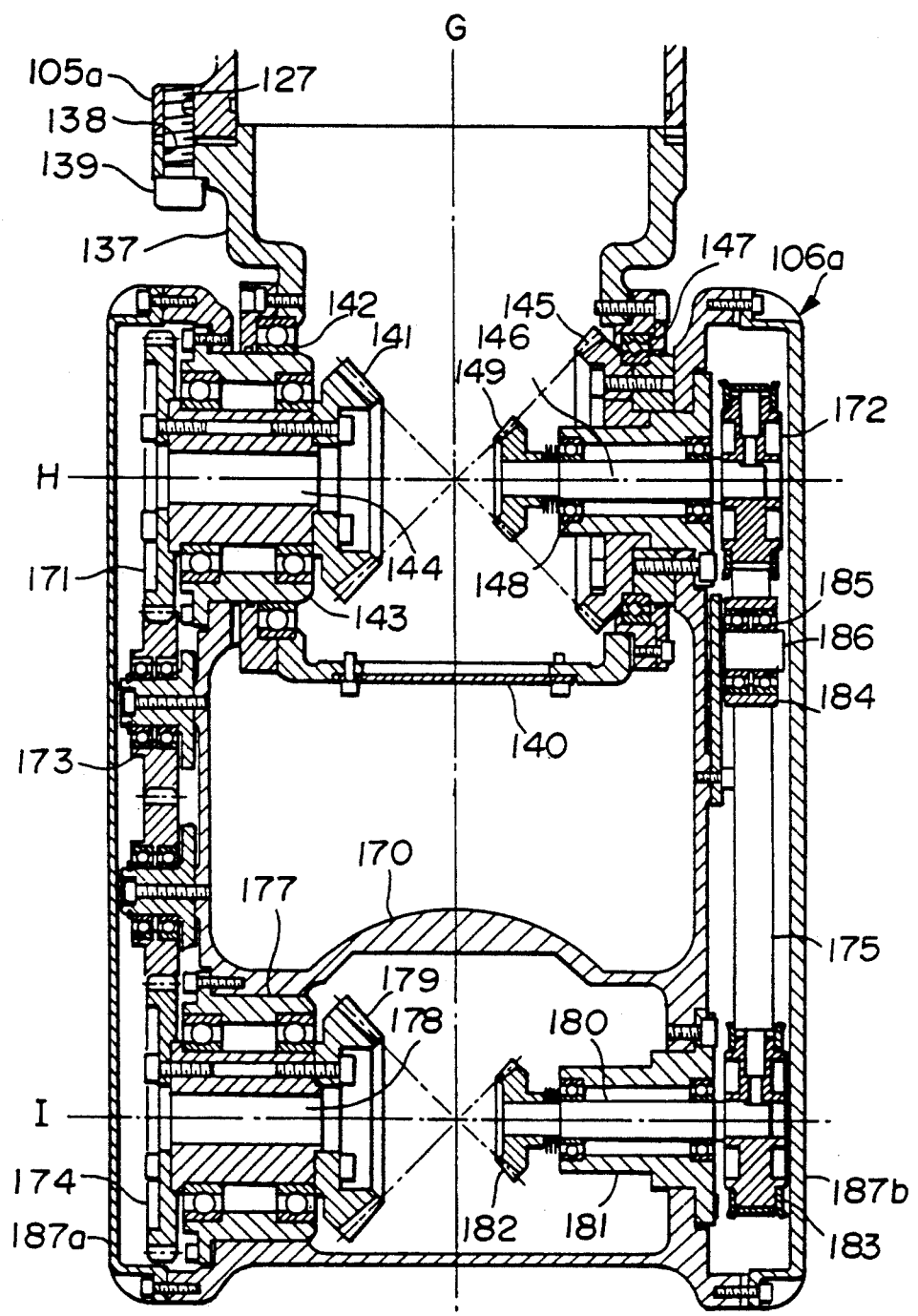
FIG. 12 shows a sectional view in the direction of an arrow XII—XII of FIG. 14 showing an example of a first wrist member construction according to the present invention.
Figure 13:
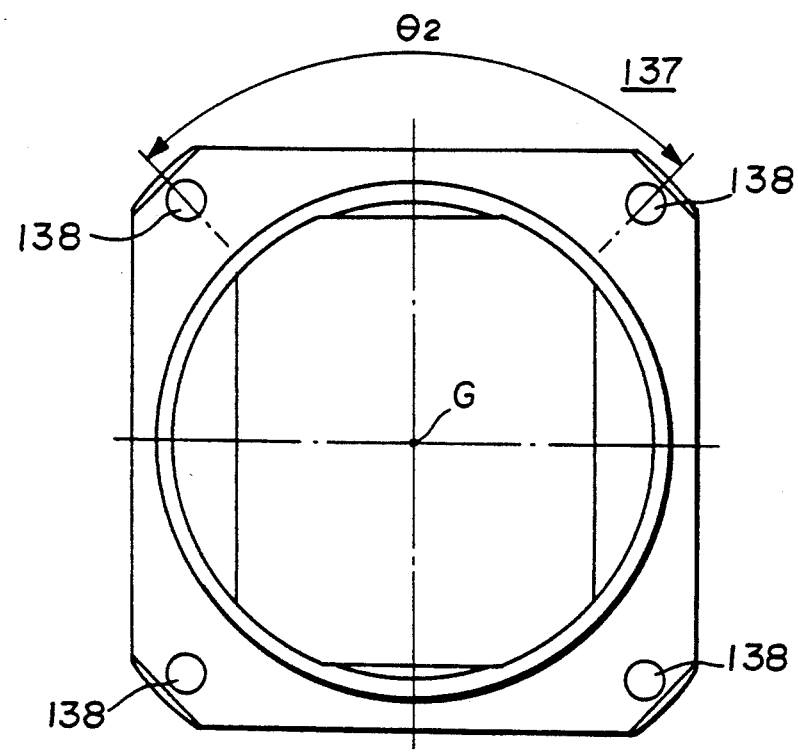
FIG. 13 shows a view in the direction of an arrow XIII of FIG. 14.

FIG. 12 shows the construction of the first wrist member 106a. A wrist bracket 137 is fixed to the end of the flange 105b by means of attachment bolts 139 threaded into attachment holes 138 which correspond with the attachment holes 127 of the flange 105b. With this embodiment, the wrist bracket 137 has a square shape when viewed from the front as shown in FIG. 13. Four attachment holes 138 are provided at the four corners on a circle concentric with the axis G as with the flange 105b. Consequently, the angle θ2 subtended by the adjacent attachment holes 138 and the axis G is 90°.

A bracket 170 is fitted to both side faces of the wrist bracket 137. The bracket 170 is supported by means of a bearing 142 so as to be freely rotatable about the axis H with a bearing 143 concentric with the axis H. A bevel gear 141 is attached to one end of the bearing 143. A bevel gear 145 and a shaft 146 are supported opposite the bevel gear 141 by respective bearings 147, 148 so as to be freely rotatable about the axis H. A bevel gear 149 is fixed to one end of the shaft 146.

The bevel gears 141, 145, 149 are engagable with the respective bevel gears 132, 131, 133. Furthermore, a plane gear 171 is fitted to the other end of the bearing 143, and a pulley 172 is fitted to the other end of the shaft 146.

A bearing 177 is fixed to the bracket 170 on the side away from the wrist bracket 137. A bevel gear 179 is supported on one end of the bearing 177 so as to be freely rotatable about an axis I parallel with the axis H. A plane gear 174 is attached to the other end of the bearing 177 and is geared to the plane gear 171 by means of a plane gear 173 axially supported on the bracket 170. A shaft 180 is provided opposite to the bevel gear 179 on the same axis I and is supported so as to be freely rotatable about the axis I by means of a bearing 181. A bevel gear 182 is attached to an end of the shaft 180, and a pulley 183 is attached to the other end. The pulley 183 is connected to the pulley 172 by means of a timing belt 175.

A tension pulley 184 for adjusting the tension of the timing belt 175, is rotatably supported on a shaft 186 by means of a bearing 185. The shaft 186 is disposed on the bracket 170 so as to lie parallel with the axes H and I. The sides of the bracket 170 are covered by respective covers 187a, 187b.

Figure 14:
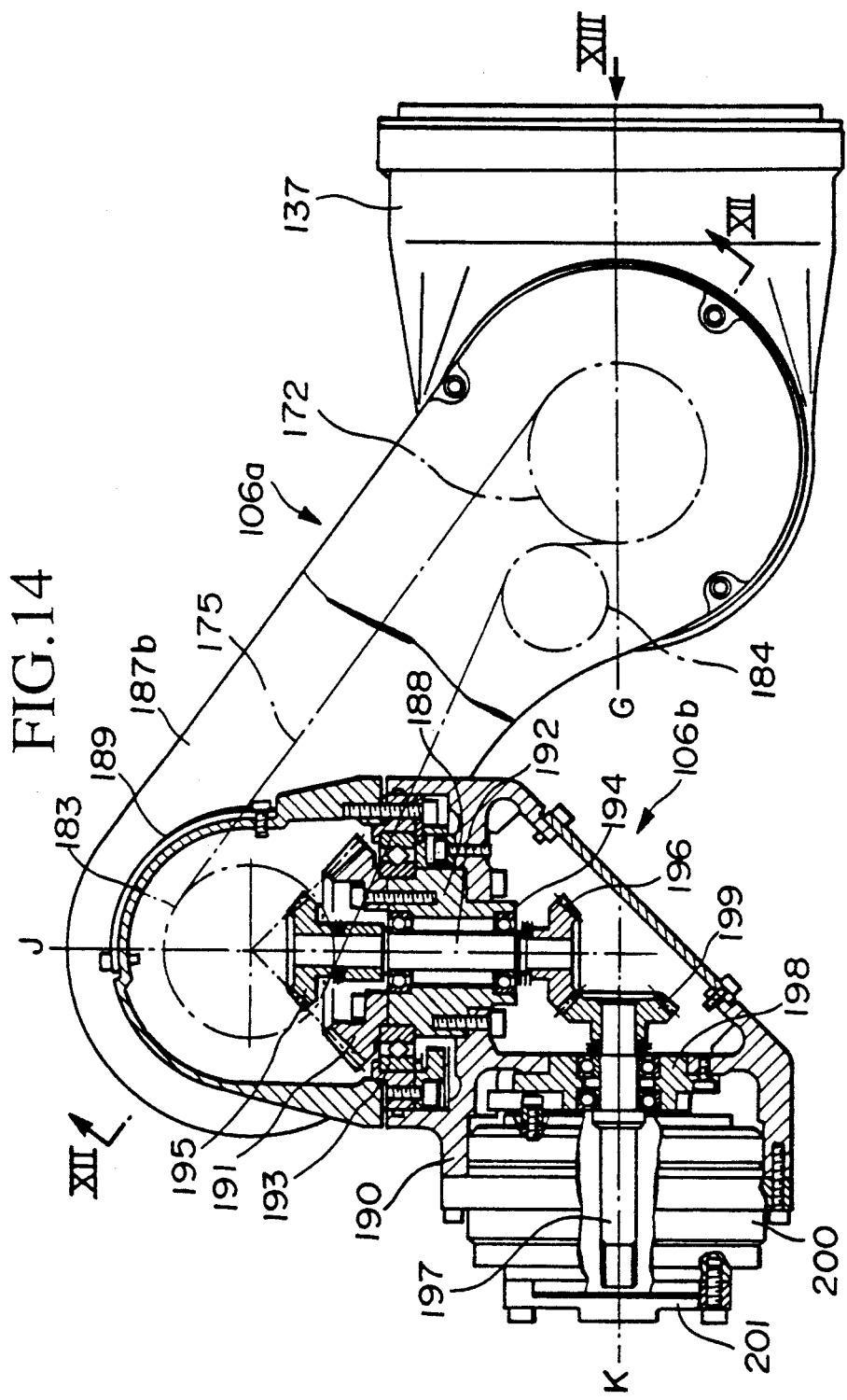
FIG. 14 shows a sectional view showing an example of a construction of the second wrist member of FIG. 8.

FIG. 14 shows the construction of the second wrist member 106b. Symbol 189 indicates a cover for the bevel gears 179, 182. A bracket 190 is supported on the cover 189 so as to be freely rotatable about an axis J orthogonal to the axis I, by means of a bearing member 188. A bevel gear 191 is fixedly attached to the bracket 190 by means of a bearing member 188. A shaft 192 is supported on the bearing member 188 so as to be freely rotatable about the axis J, by means of a bearing 194. Respective bevel gears 195, 196 are fixed to opposite ends of the shaft 192. The bevel gears 191, 195 are able to engage with the respective bevel gears 179, 182.

A shaft 197 is provided so as to be freely rotatable about an axis K orthogonal with the axis J of the bracket 190 by means of a bearing 198. A bevel gear 199 which engages with the bevel gear 196 is fitted to one end of the shaft 197. The other end of the shaft 197 is connected to a reduction unit 200 provided on the bracket 190. An output member 201 is provided on the end of the reduction unit 200.

The operation of a wrist mechanism constructed as above is described as follows.

The rotating base 103 is rotated about the axis A by a motor, the first arm 104 is swung about the axis B by a motor, and the second arm 105 is swung about the axis C by means of a motor and the link mechanism 107.

The drive from the motor 111 is transmitted successively from the reduction unit 114, the output shaft 114a, the plane gears 117, 124, the output shaft 121, the adaptor 128, the bevel gear 131, the bevel gear 145 so as to swing the first wrist member 106 up and down about the axis H. The drive from the motor 112 is transmitted successively from the reduction unit 115, the output shaft 115a, the plane gears 118, 125, the output shaft 122, the adaptor 129, the bevel gears 132, 141, the shaft 144, the plane gears 171, 173, 174, the shaft 178, the bevel gears 179, 191 to swing the second wrist member 106b left and right about the axis J. The drive from the motor 113 is transmitted successively through the coupling 116, the output shaft 123, the adaptor 130, the bevel gears 133, 149, the shaft 146, the pulley 172, the timing belt 175, the pulley 183, the shaft 180, the bevel gears 182, 195, the shaft 192, the bevel gears 196, 199, the shaft 197 to the reduction unit 200 so as to rotate the output 201 about the axis K.

The wrist 106 is fixed to the flange 105b by means of attachment bolts 139 threaded into attachment holes 127, 128 provided on both the wrist bracket 137 and the flange 105b. However with the previous embodiment, since the angles $\theta_1$, $\theta_2$ subtended by the adjacent attachment holes 127, 138 with the axis G are 90°, the wrist 106 can be attached to flange 105b at an angle to the axis G of 90° or 180° from the condition shown in FIG. 8.

Figure 15:
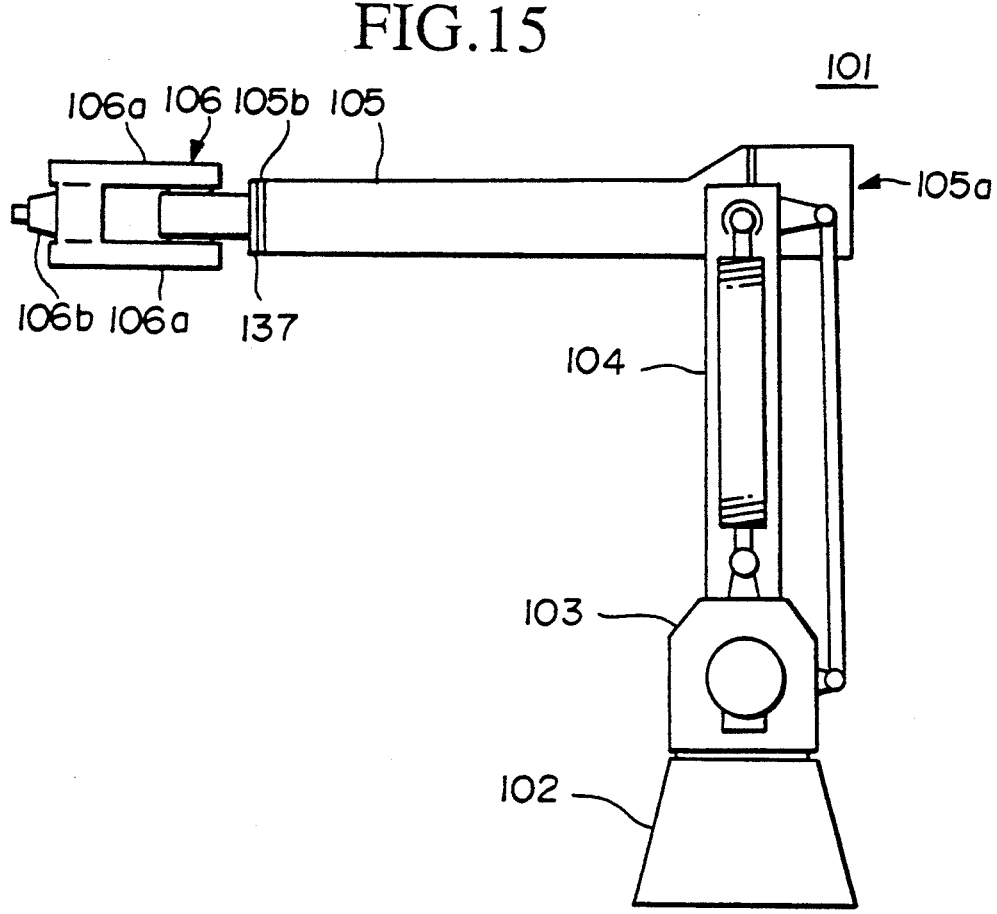
FIG. 15 shows a view of an example of the change in the attachment angle of the wrist of the example of FIG. 8.

Consequently, when using the wrist 106 for lengthwise work, with a small left/right axis operating range and a large up/down operating range as shown in FIG. 8 for example, the attachment of the wrist 106 may be turned through 90° with respect to the axis G, to give a wrist 106 orientation as shown in FIG. 15. Hence the same wrist 106 may be used as a wrist with a wide left/right operating range.

Figure 16:
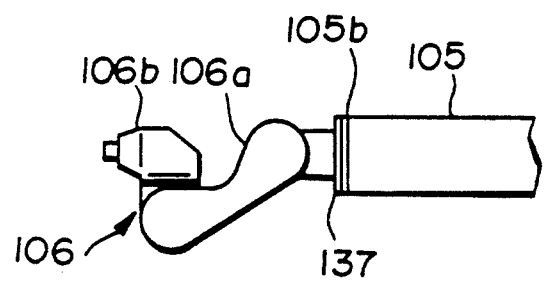
FIG. 16 shows a view of an example of the change in the attachment angle of the wrist of the example of FIG. 8.
Figure 17:
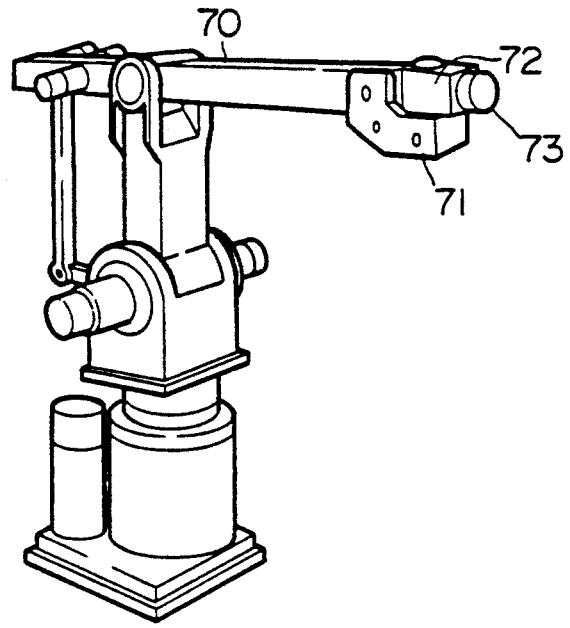
FIG. 17 shows an overall view of a painting robot being an example of a conventional painting robot.
Figure 18:
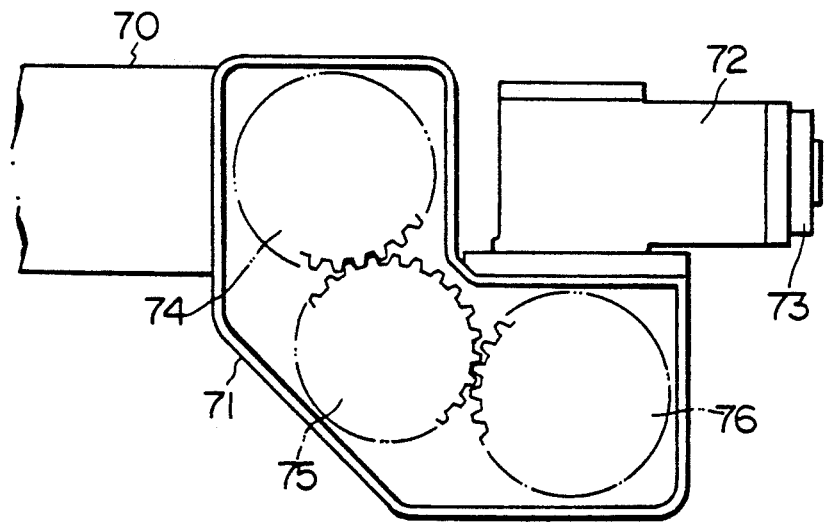
FIG. 18 shows a vertical sectional view of a part of the wrist mechanism of the conventional painting robot.
Figure 19:
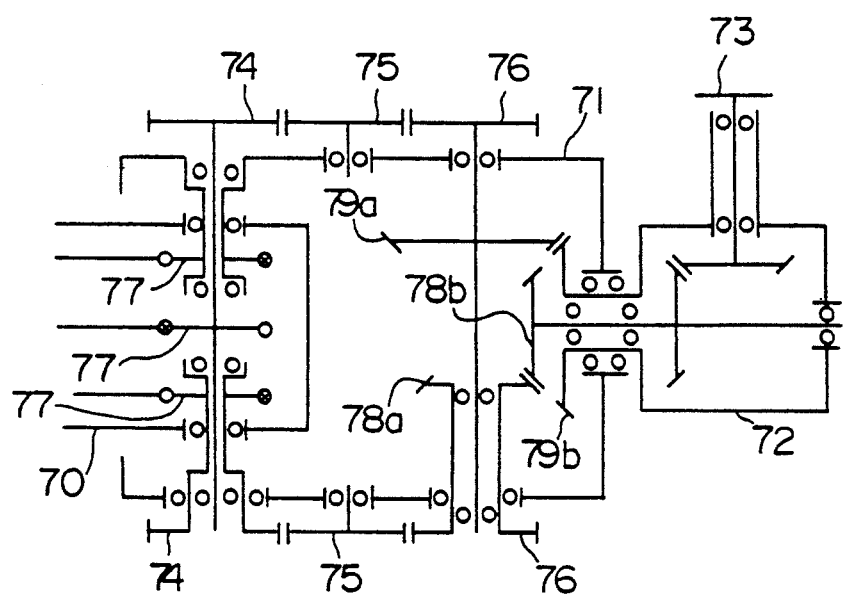
FIG. 19 shows a view of a motor rotational drive transmission mechanism in the wrist mechanism of the conventional painting robot.

Furthermore, when the operating angle about the up/down axis differs with up and down, for example as shown in the FIG. 8 condition where the up direction has a wider operating range, then for a wrist with advantages for work in the down direction, but which can still be used for up direction work, the wrist 106 may be turned through 180° and reattached as shown in FIG. 16. In this way the same wrist 106 may be used as a wrist with a wide operating range in the down direction. Also, since the bevel gears 131, 132, 133 are disposed at the end of the arm 105 with their axes coaxial with the axis G, then rotation of the bevel gears 131, 132, 133 is transmitted to the bevel gears 141, 145, 149 irrespective of the attachment angle of the wrist 106 with respect to the axis G.

The angles $\theta_1$, $\theta_2$ subtended between the adjacent attachment holes 127, 138 and the axis G may be 72° for the case of five attachment holes and 60° for the case of six attachment holes. Consequently, the attachment angle of the wrist 106 with respect to the axis G, can be changed in increments of 72° for the former case and 60° for the latter case.

What is claimed is:

1. A robot wrist mechanism having the following features;
    an arm rotated by a drive source, said arm having an axis;
    a first wrist member rotatably supported on the end of the arm so as to be rotatable about a first rotation axis orthogonal to the axis of the arm;
    a second wrist member supported at another end of the first wrist member so as to be freely rotatable about a second rotation axis, wherein the second axis and the arm axis lie in the same plane;
    a mounting shaft provided on the second wrist member with an axis of the mounting shaft lying in a plane including the first axis and orthogonal to the second axis, wherein
    the second wrist member protrudes upwards with respect to a plane including the first axis and the axis of the mounting shaft.

2. A robot wrist mechanism according to claim 1, wherein said first axis is normally horizontal.

3. A robot wrist mechanism according to claim 1, wherein said arm is rotatable in a vertical plane.

4. A robot wrist mechanism according to claim 3, wherein said arm is supported on a rotation base, said rotation base being supported on a fixed base so as to be rotatable in a horizontal plane.

5. A robot wrist mechanism according to claim 4, wherein said arm is attached to an end of a first arm, said first arm being supported on the rotation base so as to be freely rotatable in a vertical plane.

6. A robot wrist mechanism according to claim 1, wherein said first wrist member contains a transmission mechanism for transmitting a drive force to rotate the second wrist member about the second rotation axis, and to rotate the mounting shaft about its axis of rotation.

7. A robot wrist mechanism according to claim 1, wherein said arm is provided with a drive mechanism for independently rotating said first wrist member about the first rotation axis, said second wrist member about the second rotation axis, and said mounting shaft about its rotation axis.

8. A robot wrist mechanism according to claim 7, wherein said arm is provided with a drive mechanism in a base end thereof and is further provided with concentrically arranged transmission shafts for transmitting respective drive forces from said drive mechanism to a tip end of said arm.

9. A robot wrist mechanism according to claim 8, wherein bevel gears are provided at the ends of said respective shafts of said arm, and bevel gears which engage with said bevel gears are provided at a base end of said first wrist member.

10. A robot wrist mechanism according to claim 9, wherein at least one of said bevel gears and a mating bevel gear are provided at the end of the first wrist member, and the bevel gears corresponding to the end of the first wrist member and to the base end are connected by a transmission member housed in the first wrist member.

11. A robot wrist mechanism according to claim 10, wherein said transmission member is plane gears.

12. A robot wrist mechanism according to claim 10, wherein said transmission member is a transmission belt.

13. A robot wrist mechanism according to claim 7, wherein said drive mechanism comprises direct drive type motors arranged in series in the direction of the axis of the arm, and the rotor and stator of adjacent motors are connected in order.

14. A robot wrist mechanism having the following construction;
an arm rotated by a drive source, said arm having a plurality of output shifts driven by the drive source, the output shafts being arranged concentric with the axis of the arm,
a wrist member fitted to the end of the arm and being swingable by the drive force supplied from the drive shaft,
bevel gears provided at the ends of the respective output shafts of the arm,
bevel gears provided on the wrist member so as to be engageable with said bevel gears,
a fastening mechanism connecting the wrist member with respect to the end face of the arm, said fastening mechanism having flanges provided at each end of the arm and the wrist member for connecting the arm and wrist member, wherein the flanges are formed to have a square flange face with flange holes arranged 90 degrees apart, thereby allowing connecting of the wrist member in the rotated conditions at right angles with respect to the axis of the arm.

15. A robot wrist mechanism according to claim 14, wherein said wrist member comprises a first wrist member supported on the end of said arm so as to be freely rotatably about a first rotation axis orthogonal to the axis of said arm, a second wrist member supported on the other end of said first wrist member so as to be freely rotatable about a second rotation axis lying in the same plane as the axis of said arm, and a mounting shaft provided on said second wrist member.

16. A robot wrist mechanism according to claim 14, wherein at least one of said bevel gears and a corresponding bevel gear are provided on the end of the first wrist member, and the bevel gears corresponding to the tip end and base end of the first wrist member are connected by a transmission member housed inside said first wrist member.

17. A robot wrist mechanism according to claim 16, wherein said transmission member comprises plane gears.

18. A robot wrist mechanism according to claim 16, wherein said transmission member is a transmission belt.

* * * * *